United States Patent [19]

Aloisio, Jr. et al.

[11] 4,349,587
[45] Sep. 14, 1982

[54] METHOD FOR COATING FIBER WAVEGUIDES

[75] Inventors: Charles J. Aloisio, Jr., Chamblee, Ga.; Lee L. Blyler, Jr., Basking Ridge, N.J.; George S. Brockway, Lawrenceville, Ga.; Arthur C. Hart, Jr., Chester, N.J.; Carl R. Taylor, Lawrenceville, Ga.

[73] Assignee: Bell Telephone Laboratories, Incorporated, Murry Hill, N.J.

[21] Appl. No.: 243,269

[22] Filed: Mar. 12, 1981

[51] Int. Cl.³ .................. B05D 1/18; B05D 7/20; G02B 5/14
[52] U.S. Cl. .................. 427/163; 427/434.5; 427/434.7
[58] Field of Search .................. 65/3.11; 264/1.5; 427/434.5, 434.7, 163

[56] References Cited

U.S. PATENT DOCUMENTS 4,246,299  1/1981  Ohls .................. 427/163 X

Primary Examiner—James R. Hoffman
Attorney, Agent, or Firm—James H. Fox; Peter V. D. Wilde

[57] ABSTRACT

The specification describes techniques for coating fiber waveguides by passing the fiber through a reservoir of coating material while preventing the gross accumulation of bubbles in the reservoir. Preventing accumulation of bubbles improves coating concentricity and quality.

11 Claims, 8 Drawing Figures

METHOD FOR COATING FIBER WAVEGUIDES

BACKGROUND OF THE INVENTION

It is now well known that long lengths of glass fibers have considerable potential strength but the strength is realized only if the pristine fiber is protected with a coating the instant it is drawn. Considerable effort is being expended to develop effective techniques for coating glass fiber waveguides. Most of this activity involves coating the fiber with prepolymer material and curing the prepolymer using heat or light. Coating the fiber with a hot thermoplastic resin is also being investigated extensively. In each case the coating material is typically applied by immersion of the pristine fiber in a reservoir containing fluid prepolymer or polymer material. Typically, the fiber enters the coating fluid through a free surface, and exits through a small die at the bottom of the reservoir. The coating material is cured or cooled to a solid state, and the fiber is taken up by a suitable capstan and reel.

This general technique has been used widely and successfully for coating considerable lengths of high quality glass fiber waveguide. However, significant economical advantage is still to be realized by increasing the draw rate of commercially produced fiber. We have found new difficulties in the coating process as the rate exceeds the conventional rate of approximately one meter per second. For example, we have found that a fiber traveling at a high speed as it enters the free surface of the coating fluid draws a considerable quantity of air into the fluid medium. As coating progresses, the air accumulates in the reservoir in the form of air bubbles. As the quantity of these bubbles builds, some tend to pass through the die and remain in the fiber coating. The number of bubbles or voids found in a given length of coated fiber is believed to be related directly or indirectly to the concentration of bubbles in the reservoir. Moreover, we have found that these bubbles move rapidly with the streamlines in the fluid and interact mechanically with the fiber causing instabilities in the fiber alignment with respect to the die. It is known to be important to avoid excursions of the fiber as it passes through the die. In addition instabilities associated with air bubble entrainment can produce fiber misalignment within the coating as well as coating diameter variations.

In summary we have identified a new and important obstacle to high-speed manufacture of glass fiber waveguide.

SUMMARY OF THE INVENTION

We have discovered that the problem of copious bubble formation and consequent entrainment of bubbles in the fiber coating or misalignment of the fiber within the coating can be alleviated or substantially eliminated by properly employing a baffle in the reservoir of coating material. We have demonstrated that a properly designed baffle effectively separates the bubbles from the region where the fiber traverses and exits the reservoir. We have also observed stripping of bubbles from this region which we attribute to a hydrodynamic increase in the fluid pressure as the fiber passes through the constriction in the fluid path caused by the presence of the baffle. The stripping of the bubbles reduces the incidence of voids in the coating.

DETAILED DESCRIPTION

Figure 1:
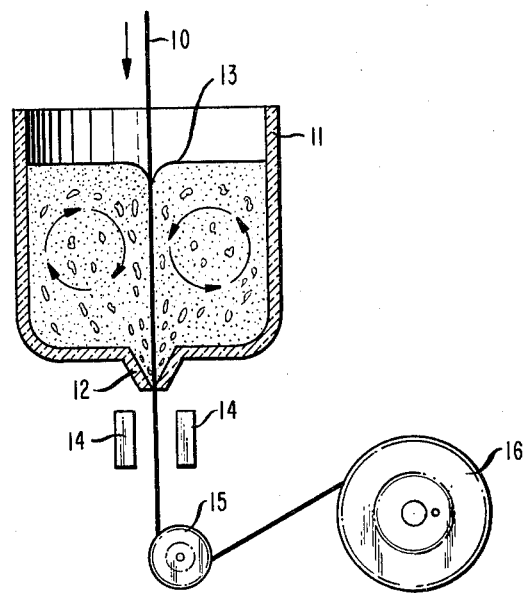
FIG. 1 is a schematic view of a fiber drawing apparatus illustrating how the problem to which the invention is addressed developes.

The problem to which the invention is addressed develops in a typical coating apparatus in the manner shown schematically in FIG. 1. The fiber 10 is pulled from a preform, crucible or other suitable source (not shown), passes through the coating reservoir 11, and exits the reservoir through coating die 12. The coated fiber is then cured, for example by UV lamps 14, and taken up on a suitable capstan 15 and reel 16. The free surface of the coating fluid 12 typically assumes the shape indicated, with a downwardly extending meniscus 13 clearly evident. The size of the meniscus varies with several parameters, but nearly always forms if the speed of travel of the fiber through the coating fluid is sufficiently rapid. The presence of this meniscus indicates a positive flow of air into the region of the fiber around the point of entry of the fiber into the fluid. Air inevitably is drawn into the fluid medium where it forms bubbles during the coating operation. As the number of bubbles increases, the likelihood increases that some will become entrained in the final coating. It should be noted that the coating fluid in the reservoir develops a strong flow pattern under the influence of the rapidly moving fiber. The flow pattern is evident from the motion of bubbles that develops, as shown in FIG. 1. Bubbles are formed near the meniscus 13 and travel with the fiber downward through the fluid. Some bubbles exit with the fiber but a considerable number flow outward from the fiber and into the circular flow pattern shown in the Figure. However, as the number of bubbles increases, the incidence also increases of bubbles drawn from the lower reaches of the flow pattern through the exit die, where they become entrained in the fiber coating. It has not been established whether the number of bubbles present in the fluid directly or indirectly indicates the number entrained in the fiber coating. We believe that some bubbles, at least, proceed directly from the meniscus, along the fiber, through the exit die. However, we have established that such events are accompanied by the formation of copious bubbles in the fluid.

Using video and photographic methods, we have studied the dynamics of the coating fluid in considerable detail. The understanding we have gained leads us to the solution that we now describe.

Figure 2:
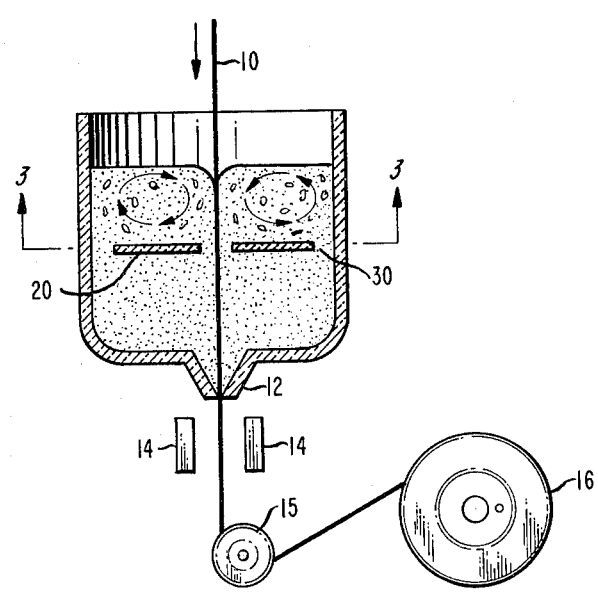
FIG. 2 is a schematic representation of the use of a baffle in accordance with the invention to prevent entrainment of gas bubbles in the fiber coating.

FIG. 2 shows schematically the same coating apparatus that appears in FIG. 1 but with the important addition of a baffle 20. A baffle in this context is defined as a physical member designed to restrict the flow of bubbles from one region of a fluid reservoir to another. In this case the flow of bubbles is restricted between the main body of the coating material reservoir and the region where the fiber traverses the fluid. In some embodiments, particular attention is directed to preventing the flow of bubbles to the region of the reservoir near the exit die. The baffle extends around the fiber, for an appreciable distance outward into the reservoir. It is not necessary that the baffle close with the walls of the reservoir. It is necessary that the baffle be arranged so as to avoid contact with the glass fiber. The effect of the baffle is illustrated in the Figure. It serves to confine the bubbles to the upper region of the reservoir, thus reducing substantially the risk that bubbles will exit the coating die 12, and become imbedded in the fiber coating.

Figure 3:
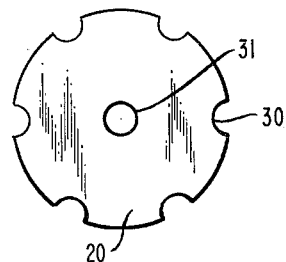
FIG. 3 is a sectional view taken as shown through the middle of the baffle of FIG. 2.
Figure 4:
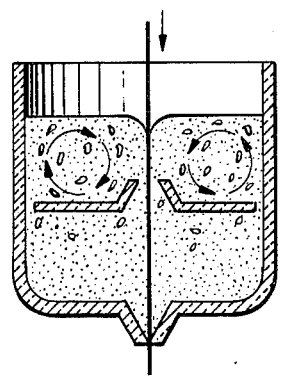
FIGS. 4, 5, 6 and 7 illustrate various alternative baffle configurations useful to provide results similar to that obtainable with the baffle of FIG. 2.
Figure 5:
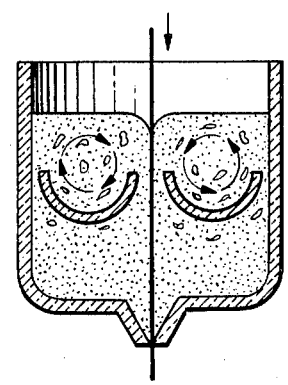

An exemplary baffle design is shown in FIG. 3. The openings 30 provide for circulation of coating fluid from the lower chamber of the reservoir to the upper chamber. Fluid is drawn by the rapidly moving fiber down through the hole 30 into the lower chamber, and it is advantageous to provide a return path to the upper chamber. However, the opening 31 can be made large enough to make that unnecessary. The actual size of the opening 30 depends on several considerations including the draw speed, which in large part establishes the severity of the problem, and the effectiveness with which the bubbles need to be stripped. The diameter of the fiber is also a consideration although that typically remains in the range of 50 to 500 microns. We have successfully used a baffle with an opening of 800 $\mu$m to coat a fiber with a nominal diameter of 125 $\mu$m.

An important consideration in the choice of the size of the opening in the baffle is the pressure gradient developed in the fluid in the vicinity of the baffle opening. We believe that the hydrodynamic forces generated using a baffle in the fiber coating arrangement described are effective in stripping bubbles on or near the fiber surface and preventing the inclusion of these bubbles in the final coating. Thus the baffle, depending on its design, may serve two important functions. The first, we mentioned, is the prevention of accumulation of copious quantities of bubbles in the fluid reservoir, thus reducing sporadic lateral physical displacement of the fiber during the coating operation, and attendant lack of concentricity of the fiber and the coating. The second advantage of the baffle, which is regarded as optional depending on the choice of the process designer, in the stripping of bubbles from the surface, or from near the surface, of the fiber prior to reaching the exit die. The exit die can be considered a form of baffle in the sense used here, and is itself useful for stripping bubbles in the manner just described. However, we have found that the single stripping stage represented by the exit die typically does not eliminate bubble inclusions in the final coating when operating at high coating speeds. A separate bubble stripping stage, as described here, is an important addition in coating processes where bubble inclusions are otherwise prevalent. Situations may even arise where multiple, i.e., two or more, baffles will be useful for more complete stripping.

It is evident that for most effective stripping, the opening in the baffle through which the fiber passes should be small enough to impede the flow of bubbles through the baffle. Openings only slightly larger than the fiber are optimum from this standpoint, and thus we recommend openings smaller than a few, i.e., three, times the fiber diameter.

It should be appreciated that larger diameters are useful for achieving goal number 1 described above, and are useful also for some degree of bubble stripping. We believe that bubble stripping results from abrupt hydrodynamic pressure changes as the fiber traverses the fluid. From our experiments and observations, we calculate that useful stripping of bubbles from the fiber occurs if the fiber experiences a pressure change equivalent to 300 psi/sec prior to reaching the vicinity of the exit die. Thus the fiber, during this coating process, undergoes two distinct hydrodynamic pressure changes. The pressure change defined here is in terms of "equivalent" pressure change since the actual change in pressure is dependent on the design of the baffle and the rate of speed of the fiber. The minimum of 300 psi/sec quoted above is calculated based on a fiber speed of $\frac{1}{3}$ meter/sec and a baffle design in which the pressure change occurs over a distance of approximately 1 cm. In this case the pressure difference experienced by the fiber while passing through the baffle is of the order of 10 psi.

Other baffle arrangements can be designed to achieve results similar to those just discussed. Three advantageous configurations are shown in FIGS. 4, 5, 6 and 7. The baffle configuration of FIGS. 4 and 5 conform somewhat to the flow pattern of the fluid in the upper chamber. The arrangement of FIG. 8 affords the advantage of ease in threading the fiber through the reservoir during startup. The use of multiple baffles is illustrated in FIG. 7.

Figure 8:
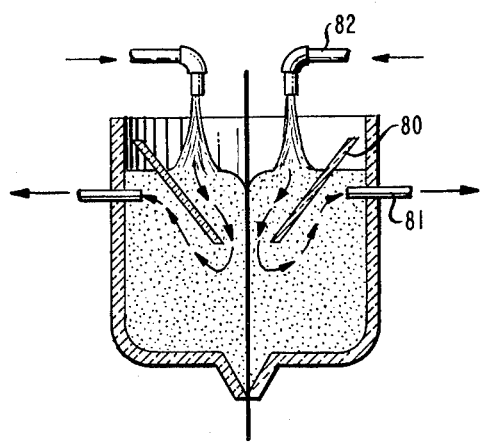
FIG. 8 illustrates a circulating arrangement for eliminating bubbles from the coating reservoir.

Having recognized the need to eliminate accumulation of bubbles in the coating fluid reservoir at a location that risks entrainment of the bubbles in the fiber coating, we devised the alternative of eliminating the bubbles by circulating the coating fluid into and out of the reservoir. In this manner one is effectively simply continuously replenishing the reservoir with bubble-free coating fluid. An arrangement for achieving this is shown in FIG. 8. This particular arrangement employs a combination of a baffle with recirculating means stripping bubbles from the reservoir. The baffle is shown at 80, the means for eliminating the bubbles from the reservoir is outlet 81, and the means for introducing bubble-free coating material is shown at 82. Material from outlet 81 may be processed by filtering, centrifuging vacuum degassing or the like to remove the bubbles, and then returned to the reservoir via inlet 82. The baffle aids in the effectiveness of this apparatus, but is not essential. Circulating the fluid, with replenishment with bubble free material, can alone prevent accumulation of bubbles in the reservoir.

As mentioned at the outset, the presence of these rapidly moving bubbles in the coating fluid physically displaces the fiber in an erratic manner and leads to poor centering of the fiber. The resulting coating is non-uniform around the fiber and this reduces the effectiveness of the fiber when used for lightwave transmission. Thus, the use of the baffle not only produces a fiber with a smooth, bubble-free coating, but one that is well centered within the coating.

It should be evident that continuous stripping of bubbles from the coating apparatus according to the teachings of the invention is an important expedient leading to good quality coatings produced at high fiber drawing rates. The value of the invention cannot therefore be measured in terms of improvements in the coating apparatus per se, but is measured more appropriately in terms of an improved method for producing coated fiber waveguide.

The coating process of the invention is suitable for primary coating of glass or plastic waveguide, or for secondary coating of such waveguide that is already coated. The process may be applied to either or both steps of a dual- or multiple-coating in-line process or to any step of a sequential multiple coating process where the fiber is reeled between coating steps. The process is also useful for the application of fluids in the fiber for surface modification prior to coating, for application of dyes or colorants for color coding, or application of fluid materials for other purposes. It is also useful for coating films composed of materials other than glass such as polymer fibers, crystal fibers and metal fibers.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. Method for the manufacture of coated fiber comprising the steps of:
   pulling the fiber from a fiber source,
   passing the pulled fiber through a reservoir of liquid coating material and thereafter through an exit die in the reservoir,
   the invention characterized in that the fiber is passed through the liquid coating material at a rate rapid enough to cause bubbles to become entrained in the reservoir, and
   characterized further by the step of continuously removing bubbles from the liquid coating material.

2. The method of claim 1 in which the bubbles are removed by a baffle.

3. The method of claim 1 in which coating material is circulated through the reservoir.

4. The method of claim 1 in which the fiber is passed through a reservoir having an upper and lower chamber with a baffle therebetween, and the coating material in the lower chamber is maintained substantially bubble free.

5. Method for the manufacture of coated fiber comprising the steps of:
   pulling the fiber from a fiber source,
   passing the pulled fiber through a reservoir of liquid coating material and thereafter through an exit die in the reservoir,
   the invention characterized in that the fiber is passed through the liquid coating material at a rate rapid enough to cause entrainment of bubbles where the fiber passes into the liquid coating material,
   and characterized further by the step of exposing the fiber to an abrupt hydrodynamic pressure change while the fiber is within the reservoir and prior to its entry into the exit die.

6. The method of claim 5 in which the pressure change is equivalent to at least 300 psi/sec.

7. The method of claim 6 in which the fiber is passed through the liquid coating material at a rate exceeding $\frac{1}{3}$ meter/sec.

8. The method of claim 5 in which the abrupt pressure change is created by passing the fiber through a baffle.

9. The method of claim 8 in which the opening in the baffle is less than three times the diameter of the uncoated fiber.

10. Method for applying a liquid material to the surface of a fiber comprising the steps of:
    passing the fiber through a reservoir containing the liquid material,
    the invention characterized in that the fiber is passed through the liquid material at a rate sufficient to cause bubbles to become entrained in the liquid material and characterized further by the step of exposing the fiber to an abrupt hydrodynamic pressure change while the fiber is within the reservoir and prior to its leaving the reservoir.

11. The method of claim 10 in which the abrupt pressure change is equivalent to at least 300 psi/sec.

* * * * *

UNITED STATES PATENT AND TRADEMARK OFFICE
CERTIFICATE OF CORRECTION

PATENT NO. : 4,349,587

DATED : September 14, 1982

Figure 6:
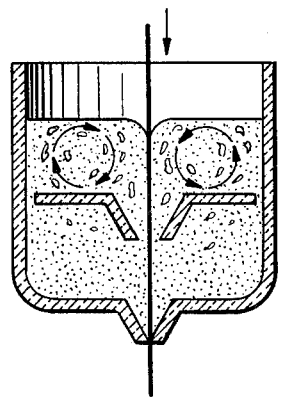
Figure 7:
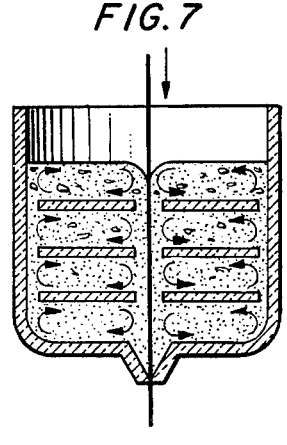

INVENTOR(S) : Charles J. Aloisio, Jr., Lee L. Blyler, Jr.,
George S. Brockway, Arthur C. Hart, Jr., and
Carl R. Taylor It is certified that error appears in the above—identified patent and that said Letters Patent is hereby corrected as shown below:

Column 4, line 23, "FIG. 8" should read --FIG. 6--.
Column 5, line 5, "in the fiber" should read --to the fiber--.

Signed and Sealed this

Seventh Day of December 1982

[SEAL]

Attest:

GERALD J. MOSSINGHOFF

*Attesting Officer*     *Commissioner of Patents and Trademarks*